(12) United States Patent
Hlebovy

(10) Patent No.: US 6,298,553 B1
(45) Date of Patent: Oct. 9, 2001

(54) COMPOSITE PRESSURE VESSEL WITH HEAT EXCHANGER

(75) Inventor: James C. Hlebovy, Chardon, OH (US)

(73) Assignee: Essef Corporation, Chardon, OH (US)

(*) Notice: Subject to any disclaimer, the term of this patent is extended or adjusted under 35 U.S.C. 154(b) by 0 days.

(21) Appl. No.: 09/061,688

(22) Filed: Apr. 16, 1998

Related U.S. Application Data

(60) Provisional application No. 60/045,092, filed on Apr. 29, 1997.

(51) Int. Cl.$^7$ ................................................. B23P 15/00
(52) U.S. Cl. ............................. 29/890.06; 29/890.03; 264/220
(58) Field of Search ................. 29/840.03, 840.06; 264/220, 219, 271.1, 275

(56) References Cited

U.S. PATENT DOCUMENTS

| | | |
|---|---|---|
| 2,718,583 | 9/1955 | Noland . |
| 3,961,010 | 6/1976 | Holmes . |
| 4,179,902 | 12/1979 | Mueller . |
| 4,317,268 | 3/1982 | Bowden . |
| 4,354,548 | 10/1982 | Carlsson . |
| 4,484,624 | 11/1984 | Vleggaar . |
| 4,589,563 | 5/1986 | Born . |
| 4,705,468 | 11/1987 | LeBreton . |
| 5,356,589 | 10/1994 | Sugalski . |
| 5,487,423 | 1/1996 | Romero . |
| 5,568,878 | 10/1996 | LeBreton . |

Primary Examiner—I Cuda
(74) Attorney, Agent, or Firm—Pearne & Gordon LLP

(57) ABSTRACT

A seamless plastic pressure vessel having a heat exchanger encased therein is disclosed. The pressure vessel is a unitary seamless wall and the wall surrounds a heat exchanger unit comprising a length of hollow tubing having ends retained in a mounting fitting. The pressure vessel may be formed by a rotational casting or blow molding technique.

6 Claims, 4 Drawing Sheets

COMPOSITE PRESSURE VESSEL WITH HEAT EXCHANGER

This application claims the benefit of U.S. Provisional Application No.: 60/045,092, filed Apr. 29, 1997.

This invention relates to heat exchangers and, more particularly, to a seamless pressure vessel which encapsulates a heat exchanger unit.

Containers surrounding heat exchanger units are typically assembled around the heat exchanger unit to encapsulate the same. A relatively large access opening must be provided in the container to accommodate the insertion of the heat exchanger. Since many heat exchangers, such as hot water heaters, require small access openings for the heat exchanger fluid piping and piping for the main body of fluid, additional seaming on the container results in potential areas of weld corrosion in the case of metallic containers or areas of stress concentration which may result in the rupture of adhesively bonded plastic containers.

SUMMARY OF THE INVENTION

This invention provides a seamless plastic pressure vessel which encapsulates a heat exchanger unit. According to this invention the pressure vessel may be manufactured by a rotational casting technique of the type set forth in U.S. Pat. No. 4,705,468 or a blow molding technique of the type set forth in U.S. Pat. No. 4,589,563.

In general, the manufacturing technique involves encapsulating a heat exchanger unit such as a helically coiled tube in a hollow, seamless plastic casing. The heat exchanger unit is positioned within a mold which defines a mold cavity having a wall which is adapted to define and form a seamless plastic envelope around the heat exchanger unit. A thermoplastic molding composition is provided on the wall to encapsulate the unit and provide the seamless pressure vessel.

One technique involves rotationally casting the seamless plastic envelope around the heat exchanger unit by mounting an inlet tube portion and an outlet tube portion of the heat exchanger unit in mounting fittings so that a heat exchanger coil is within the mold cavity during the molding operation and remains within the molded plastic envelope after the molding operation.

DETAILED DESCRIPTION OF THE INVENTION

Figure 1:
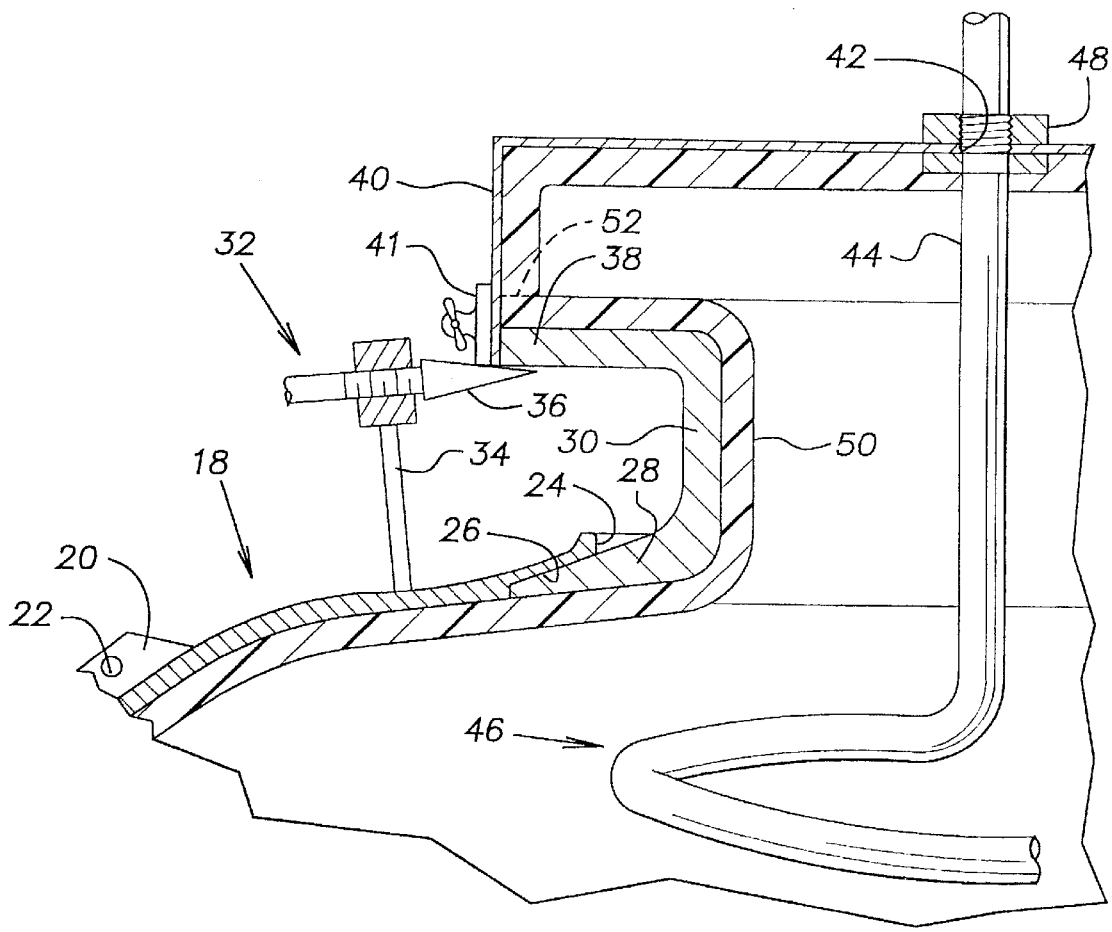
FIG. 1 is a fragmentary elevational view, partly in section, of a rotational casting mold which is adapted to be mounted in the casting arm of the machine for producing a pressure vessel according to one aspect of this invention.

According to one aspect of the invention a seamless plastic pressure vessel having a heat exchanger unit encapsulated therein is produced by a conventional rotational casting molding operation as is illustrated in FIG. 1. This casting technique is set forth in greater detail in U.S. Pat. No. 4,705,468, the subject matter of which is incorporated herein by reference. The conventional rotational casting molding operation consists of placing a plastic molding compound in finely divided form inside a hollow mold. The mold is then heated to a temperature above the melting point of the plastic and, at the same time, the mold is rotated about orthogonal axes. The powdered plastic inside the mold is heated by the heat transferred from the mold surface and sticks to the inner mold surface. Heating is continued for a sufficient length of time for complete melting or fusing of all of the plastic particles, and to permit bubbles to be released from the molten plastic. The thickness of the plastic article is determined by the amount of plastic placed within a given mold.

In FIG. 1 the molding apparatus comprises a mold arm assembly which includes upper and lower frame members rotated by a mechanism (not shown) about orthoganal axes. A rotational casting mold 18 is mounted on the casting arm of a rotational casting machine.

The mold 18 is generally cylindrical having a cylindrical body portion closed by oblate ellipsoidal end portions and is formed by two mold halves each having mating flanges 20. One of the flanges on a mold half is provided with pins (not shown) which register through apertures 22 in the other flange. If desired, quick connect clamps (not shown) may be provided to secure the mold halves together. The mold halves close and register to define an axial opening 24 therein. A circular recess 26 surrounds the opening 24 and receives a radially outwardly extending flange portion 28 of an outlet fitting 30. The fitting 30 may be metal or plastic.

The fitting 30 is retained in its illustrated position by a series of tapered pins 32 which are threaded through a corresponding series of rigid vertical posts 34. A tapered portion 36 of the pin 32 engages, the lower edge of an upper flange 38 as the pin 32 is treadedly advanced to draw the portion 28 into snug engagement with the recess 26.

A cap 40 surrounds the periphery of the flange 38 and has an axial opening 42 therein which receives an axially extending tube 44 of a coiled tube heat exchanger unit 46. The cap 40 is securely maintained by a clamping band 41. The other end of the heat exchanger tubing may extend axially to an identical fitting arrangement (not shown) at the other end of the mold or the tubing may extend upwardly to parallel the tube 44 and to extend through another opening in the cap 40. A nut 48 secures the tube 44. Additional access fittings (not shown in FIG. 1, but illustrated in FIGS. 4 and 5) may be provided in the side wall of the mold and may be initially attached thereto in the manner illustrated in FIG. 1.

Figure 5:
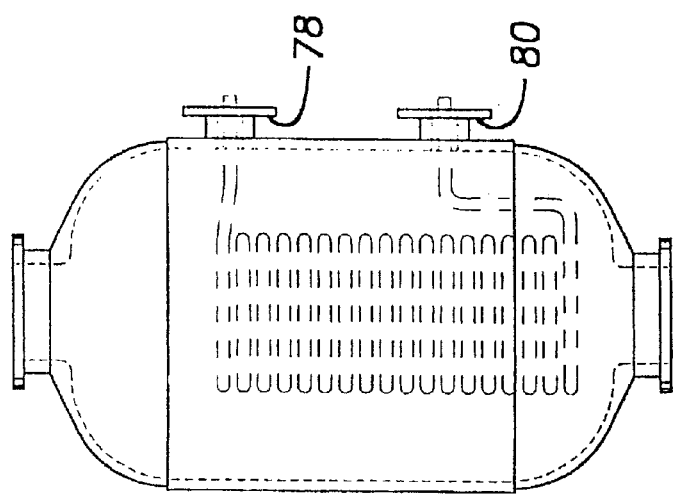
FIG. 5 is a view similar to FIGS. 3 and 4 illustrating a pressure vessel in accordance with a still further aspect of this invention.
Figure 4:
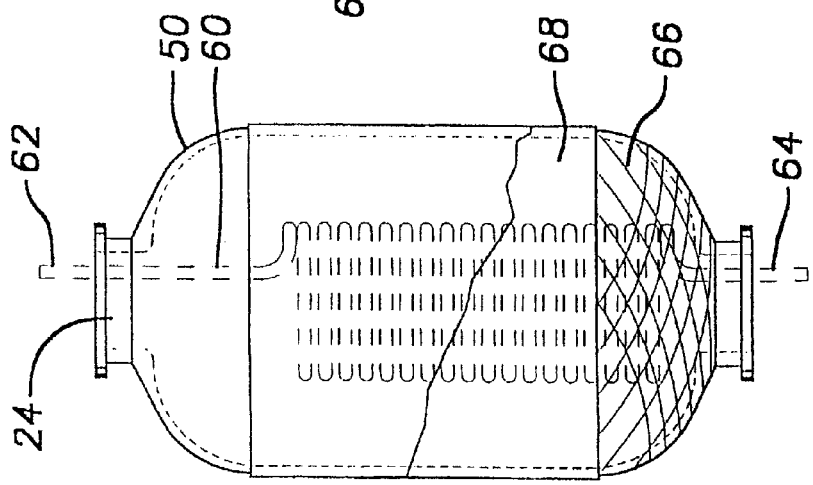
FIG. 4 is a pressure vessel similar to the vessel illustrated in FIG. 3.
Figure 3:
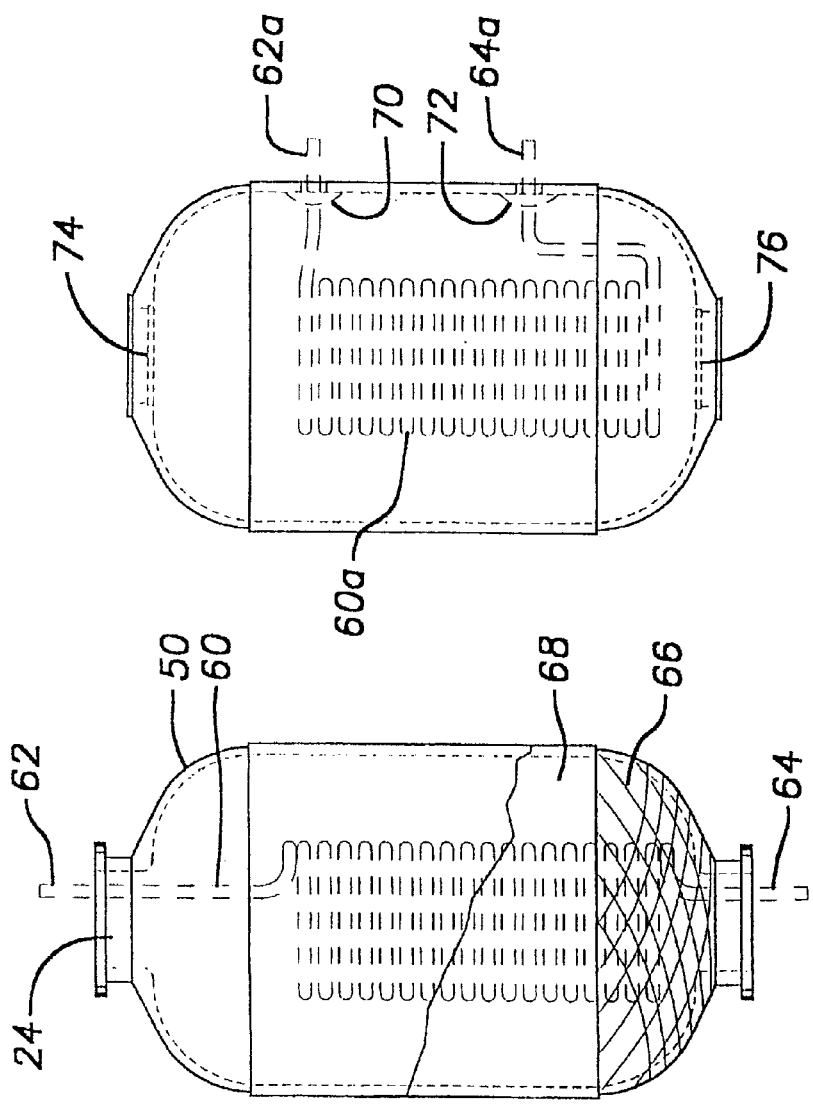
FIG. 3 is an elevational view, partly in section, of a pressure vessel having a heat exchanger mounted therein according to a further aspect of this invention.

To mold a seamless pressure vessel having a heat exchanger unit encapsulated therein as illustrated in FIGS. 3 through 5, a charge of powdered plastic resin is placed within one of the mold halves and the mold is assembled to its fitting and mounted on the rotational casting arm.

A predetermined amount of powdered thermoplastic resin is placed in the mold to provide sufficient molding compound to coat the entire inside surface of the mold and the fittings to a predetermined thickness. After the powder is put into the mold and the mold is assembled, the mold is rotated about its orthogonal axes, while the mold is heated to a predetermined temperature which will melt the thermoplastic resin. This operation is conducted within a closed oven which encloses the mold and the rotating arm. The application of heat to the mold causes the resin to melt or fuse, and the rotation of the mold about the orthogonal axes causes the liquid resin to uniformly coat the interior of the mold cavity and the interior of the fittings 30 so that a liner 50 is formed having a predetermined uniform thickness. After a predetermined time at the heating station, the arm is transferred to a cooling station, where the thermoplastic resin cools to a solid material. At a further operational station the mold is disassembled and the liner, with its fittings 30, is removed from the mold.

The liner 50 and its fitting 30 are removed from the mold as a unit. After the cap 30 is removed by removing the band 41 and the nut 48, the liner 50 is trimmed at the plane indicated by the dotted line 52. The trimmed material is also removed from the tube 44.

Figure 1A:
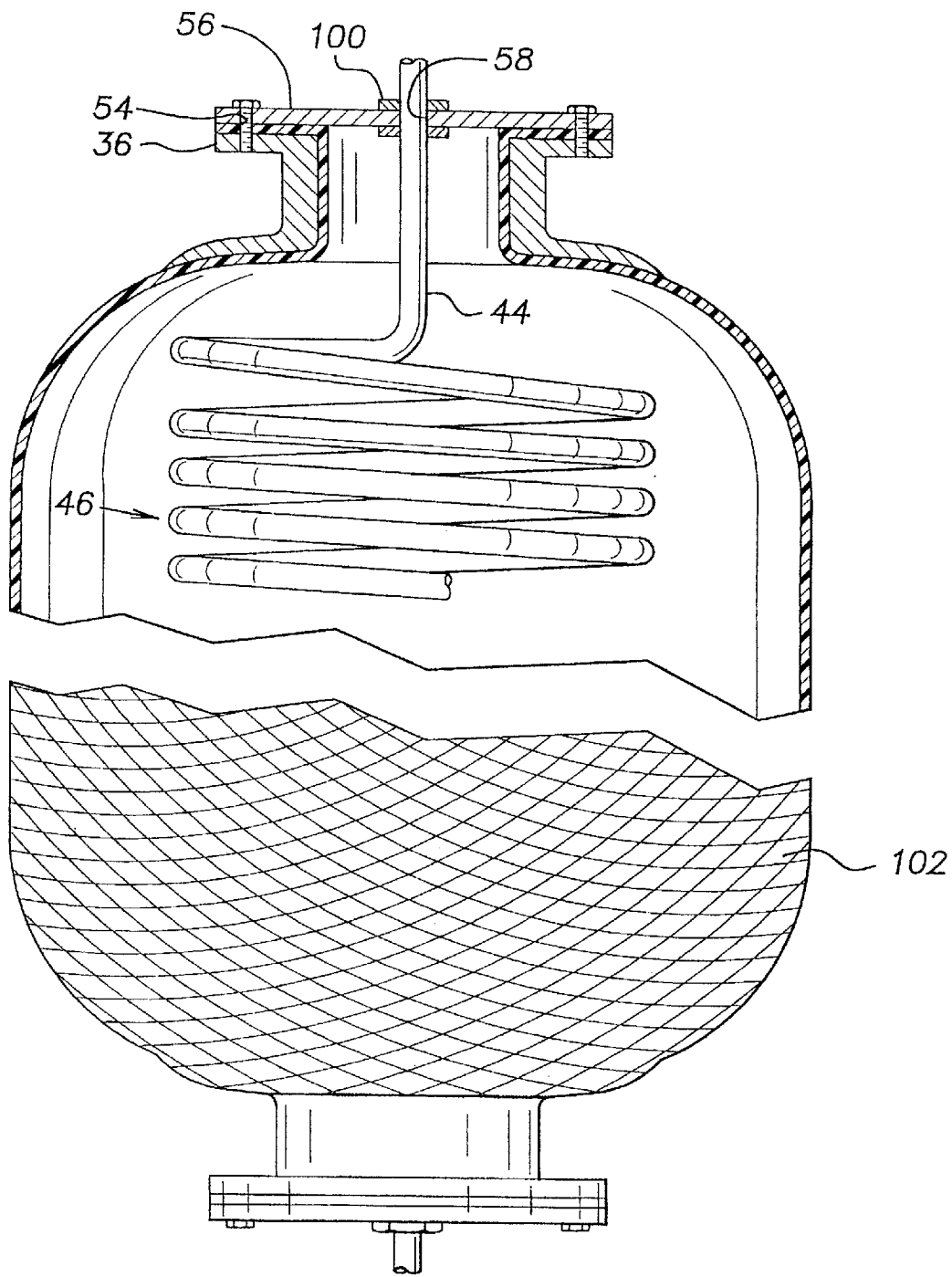
FIG. 1a is a fragmentary elevational view, partly in section, of a rotationally cast pressure vessel having a heat exchanger mounted therein according to one aspect of this invention.

Referring now to FIG. 1a, the pressure vessel is assembled by boring a series of fastener receiving holes 54 in the flange 38 and providing a closure plate 56. The plate 56 has a central aperture 58 which receives the tube 44 and the tube 44 is fastened by a nut 100. A similar closure arrangement is provided at the other end of the pressure vessel and the tank may be provided with a filament wound reinforcement 102.

As may be seen in FIGS. 3 through 5 a rotational casting procedure may be employed to produce a seamless pressure vessel having a variety of heat exchanger configurations therein.

In FIG. 3 the seamless pressure vessel includes the liner 50 and the fitting 24 molded thereto. A tubular heat exchanger unit 60 extends through and is supported by the fittings 24. The heat exchanger 60 is a helically coiled pipe having inlet and outlet tubes 62 and 64 so that a heat exchanging fluid may be introduced into the tubing to exchange heat with a fluid contained in the pressure vessel. The fluid in the pressure vessel may be introduced to and withdrawn from the vessel by tubing fittings (not shown) provided in the fittings 24.

The liner 50 may be reinforced by a helical winding 66 and by a level or hoop winding 68 in accordance with prior art techniques.

FIG. 4 illustrates a heat exchanger unit 60a having inlet and outlet ends 62a and 64a entering and exiting the liner 50 through its cylindrical side wall. Molded in plastic fittings 70 and 72 are provided in the side wall of the tank and axially aligned plastic fittings 74 and 76 are provided as mounting fittings for tubing (not shown) to convey fluid to and from the interior of the pressure vessel.

FIG. 5 illustrates an arrangement similar to the arrangement shown in FIG. 4. In FIG. 5 flanged aluminum fittings 78 and 80 are provided in the side wall of the tank while flange aluminum fittings 82 and 84 are provided at the ends of the tank for mounting tubing therethrough.

Figure 2:
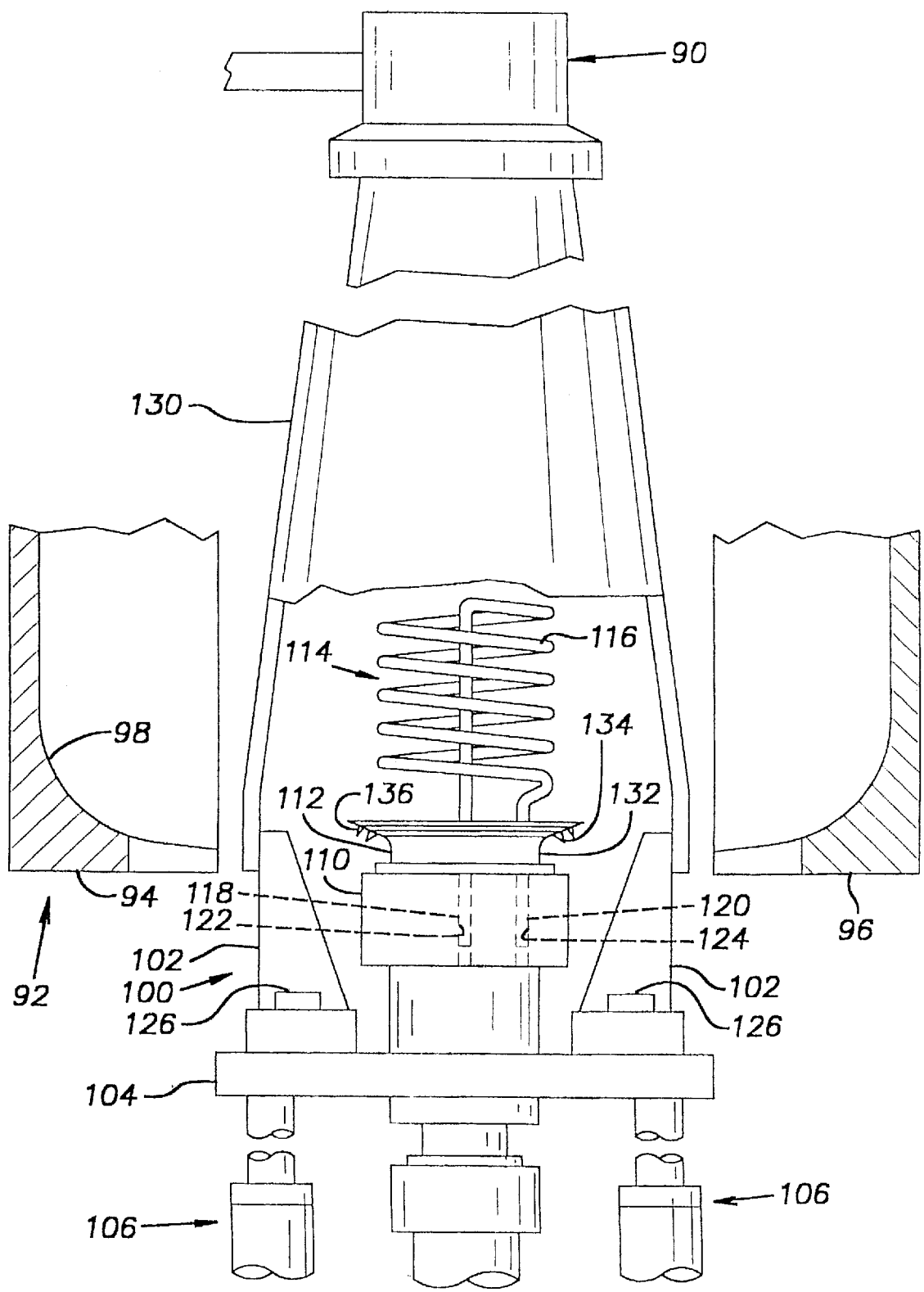
FIG. 2 is an elevational view, partly in section, of blow molding apparatus, showing the molding apparatus in a parison receiving position with a heat exchanger unit in position to be encapsulated.

According to another aspect of the present invention the seamless pressure vessel may be fabricated by a blow molding technique as is illustrated in FIG. 2. In FIG. 2 there is illustrated an apparatus which includes a conventional parison extrusion head 90, a segmented hollow mold 92 which includes a pair of mold halves 94 and 96 having an inside surface 98 which defines the outside surface of the seamless plastic tank to be molded, and a parison stretching assembly 100.

The assembly 100 includes a plurality of curved plates 102. The plates are arranged on a first platform 104 mounted on rod and piston assembles 106. A rod 108 disposed through an appropriate opening in the platform 104 supports a second platform 110. The platform 110 supports a heat exchanger unit mounting fitting 112 thereon. The mounting fitting 112 is provided with a tubular heat exchanger 114 which comprises a helically coiled tubing 116 having inlet and outlet tubing ends 118 and 120 which are molded into the fitting 112 and which project into openings 122 and 124 in the platform 110.

The rod and piston assembles 106 are adapted to move the platform 104 and the plates 102 from a lower position below the platform 110 and through an upper position above the platform 110 so that the plates may be turned radially inwardly about pivot pins 126 to form a protective dome over the heat exchanger coil 114. This apparition is explained in greater detail in U.S. Pat. No. 4,589,563. Pneumatically operated controls rods (not shown) are used to pivot the plates 102 and about the pins 126.

At the beginning of the molding process the platform 104 is raised and the plates 102 are closed over the coil 116. A tube or parison is extruded downwardly by the extrusion head 90 and is in a flowable plastic state. The extrusion rate is inversely proportional to the extruded wall thickness of the parison so that a fast extrusion rate produces a relatively thin wall and a slow rate produces a relatively thick wall.

When the parison reaches the plates 102 which envelope the tube 116 the plates separate as they move downwardly by retracting the platform 104 so that the parison 130 is expanded outwardly and envelopes the coil 116. This position is shown in FIG. 2. The mold segments 96 are moved radially inwardly while the plates are lowered by the platform 104 so that the mold surface 98 surrounds a major portion of the parison and pinches off the top of the parison and pinches a bottom portion of the parison against a neck 132 and flange portion 134 of the fitting 112. Ridges 136 may be provided on the flange 134 so that the flange may interlock with the parison as it is squeezed around the fitting 112.

After the mold segments are brought together, air is admitted to the parison through a passageway (not shown) in the extrusion head 90. The parison is thereby expanded until it conforms to the mold surface 98. After a suitable cooling period, the mold segments 94 and 96 are opened and the molded pressure vessel is removed from the table 110.

Although the preferred embodiments of this invention have been shown and described, it should be understood that various modifications and rearrangements of the parts may be resorted to without departing from the scope of the invention as disclosed and claimed herein.

What is claimed:

1. A method of manufacturing a seamless pressure vessel which encapsulates a heat exchanger unit comprising the steps of providing a tubular heat exchanger unit, positioning said unit within a mold which defines a mold cavity having a wall which is adapted to define and form a seamless plastic envelope around said unit, molding a thermoplastic molding composition on said wall to encapsulate said unit and provide a seamless pressure vessel, and removing said seamless pressure vessel and its encapsulated heat exchanger unit from said mold.

2. A method according to claim 1 wherein said tubular heat exchanger unit includes an inlet tube and an outlet tube and said method further comprises the steps of mounting an inlet tube portion and an outlet tube portion of said heat exchanger within said mold cavity by mounting said fittings on said mold wall so that said heat exchanger is within said mold cavity and so that said thermoplastic molding composition is joined to said fitting.

3. A method according to claim 1 wherein said thermoplastic molding composition is molded on said wall by a rotational casting technique.

4. A method according to claim 1 wherein said thermoplastic molding composition is molded on said wall by a blow molding technique.

5. A method of manufacturing a seamless pressure vessel which encapsulates a heat exchanger unit comprising the steps of providing a heat exchanger unit, positioning said heat exchanger unit in a mounting fitting, providing a hollow mold having an opening therein and having a mold cavity surface conforming to the outside surface of the pressure vessel, removably positioning said mounting fitting in said openings so that at least a portion of said fitting extends into said hollow mold and so that said heat exchanger unit is spaced from the mold cavity surface, providing a plastic molding composition in said mold cavity in an amount sufficient to coat said heating mold about orthogonal axes to coat said mold cavity surface and to fuse to said portion of said fitting, cooling said mold to solidify said molding composition into a seamless pressure vessel, and removing said vessel from said mold.

6. A method of manufacturing a seamless pressure vessel which encapsulates a heat exchanger unit comprising the steps of providing a heat exchanger unit, positioning said heat exchanger unit in a mounting fitting, said mounting fitting having a neck portion and a radial flange portion extending therefrom, providing a segmented hollow mold having mold segments translatable from an open position to a closed position defining a mold cavity surface conforming to the outside surface of the pressure vessel positioning said mounting fitting and said heat exchanger unit on a platform positioned between said mold segments, hot extruding a plastic parison downwardly and in axial alignment with said mounting fitting and said heat exchanger unit and said neck portion of said fitting, advancing said mold segments toward each other to pinch off a top portion of said parison, to mold said parison against said flange and neck portions of said fitting, and to define said mold cavity, admitting a pressurized gas to the interior of said parison to force said parison against said mold cavity, cooling said plastic, and removing the pressure vessel from said mold.

* * * * *